United States Patent
Badwal et al.

(10) Patent No.: US 6,280,868 B1
(45) Date of Patent: Aug. 28, 2001

(54) ELECTRICAL INTERCONNECT FOR A PLANAR FUEL CELL

(75) Inventors: Sukhvinder P. S. Badwal; Karl Foger, both of Victoria; Don Jaffrey, Tasmania; John Newman, Victoria, all of (AU)

(73) Assignee: Ceramic Fuel Cells Limited, Noble Park (AU)

( * ) Notice: Subject to any disclaimer, the term of this patent is extended or adjusted under 35 U.S.C. 154(b) by 0 days.

(21) Appl. No.: 09/155,061

(22) PCT Filed: Sep. 19, 1996

(86) PCT No.: PCT/AU96/00594

§ 371 Date: May 5, 1999

§ 102(e) Date: May 5, 1999

(87) PCT Pub. No.: WO97/35349

PCT Pub. Date: Sep. 25, 1997

(30) Foreign Application Priority Data

Mar. 18, 1996 (AU) .................................................. PN 8768

(51) Int. Cl.[7] .............................. H01M 2/14; H01M 2/16
(52) U.S. Cl. ................................. 429/34; 429/38; 429/41; 429/44
(58) Field of Search .................................. 429/34, 41, 44, 429/38

(56) References Cited

U.S. PATENT DOCUMENTS

| 5,356,730 | 10/1994 | Minh et al. | |
|---|---|---|---|
| 5,411,767 | * 5/1995 | Soma et al. | 427/453 |
| 5,462,817 | * 10/1995 | Hsu | 429/19 |
| 5,482,792 | * 1/1996 | Faita et al. | 429/30 |
| 5,496,655 | * 3/1996 | Lessing | 429/34 |
| 5,702,837 | * 12/1997 | Xue | 429/40 |
| 5,942,349 | * 8/1999 | Badwal et al. | 429/34 |
| 6,054,231 | * 4/2000 | Virkar et al. | 429/34 |

FOREIGN PATENT DOCUMENTS

| 188056 | 7/1986 | (EP) . |
|---|---|---|
| 338823 | 10/1989 | (EP) . |
| 562411 | 9/1993 | (EP) . |
| 62 154 571 | * 7/1987 | (JP) . |
| 5-205754 | 8/1993 | (JP) . |
| 5-290863 | 11/1993 | (JP) . |

* cited by examiner

Primary Examiner—Gabrielle Brouillette
Assistant Examiner—Tracy Dove
(74) Attorney, Agent, or Firm—Flehr Hohbach Test Albritton & Herbert LLP

(57) ABSTRACT

An electrical interconnect device for a planar fuel cell having solid oxide electrolyte, a cathode and a nickel-containing anode comprises a plate-like chromium-containing substrate having fuel gas-flow channels on one side and an oxidation-resistant coating on surfaces of the one side adapted to contact the anode. The coating comprises an outer oxygen barrier layer for electrically contacting the anode comprising Ni, a noble metal except Ag or an alloy of one or more of these metals and an electrically conductive metal barrier layer comprising Nb, Ta, Ag or alloys of one or more of these metals between the substrate and the outer layer.

16 Claims, 5 Drawing Sheets

ELECTRICAL INTERCONNECT FOR A PLANAR FUEL CELL

TECHNICAL FIELD

The present invention relates to fuel cells and is particularly concerned with an interconnect device for planar solid oxide fuel cells.

BACKGROUND ART

Fuel cells convert gaseous fuels (such as hydrogen, natural gas, and gasified coal) via an electrochemical process directly into electricity. A fuel cell operates like a battery, but does not need to be recharged and continuously produces power when supplied with fuel and oxidant, normally air. A typical fuel cell consists of an electrolyte (ionic conductor, $H^+$, $O^{2-}$, $CO_3^{2-}$ etc.) in contact with two electrodes (mainly electronic conductors). On shorting the cell through an external load, fuel oxidises at the anode resulting in release of electrons which flow through the external load and reduce oxygen at the cathode. The charge flow in the external circuit is balanced by ionic current flows within the electrolyte. Thus, at the cathode oxygen from the air or other oxidant is dissociated and converted to oxygen ions which migrate through the electrolyte membrane and react with the fuel at the anode/electrolyte interface. The voltage from a single cell under load conditions is in the vicinity of 0.6 to 1.0 V DC and current densities in the range 100 to 500 $mAcm^{-2}$ can be achieved.

Several different types of fuel cells are under development. Amongst these, the solid oxide fuel cell (SOFC) is regarded as the most efficient and versatile power generation system, in particular fox dispersed power generation, with low pollution, high efficiency, high power density and fuel flexibility.

Single fuel cells are connected via interconnects to form multi-cell units, termed fuel cell stacks. Gas flow paths are provided between the interconnects and respective electrodes. Numerous SOFC configurations are under development, including the tubular, the monolithic and the planar design. The planar or flat plate design is the most widely investigated. In this concept the components—electrolyte/electrode laminates and interconnect plates, which may have gas channels formed therein—are fabricated individually and then stacked together and sealed with a high temperature sealing material to form either a fixed or sliding seal. With this arrangement, external and internal co-flow, counter-flow and cross-flow manifolding options are possible for the gaseous fuel and oxidant.

Apart from good electrical, electrochemical, mechanical and thermal properties, the individual cell components must be stable in demanding fuel cell operating environments. SOFCs operate in the vicinity of 950–1000° C. although substantial efforts are under way to reduce the operating temperatures to 800–900° C. For fuel cells to be economical, typical life times of 5–6 years of continuous operation are desired. Thus long term stability of the various cell components is essential. Only a few materials are likely to fulfill all the requirements. In general, the high operating temperature of SOFCs, the multi-component nature of the fuel cell and the required life expectancy of several years severely restricts the choice of materials for cells and manifold components.

A typical solid oxide electrolyte material used in an SOFC is $Y_2O_3$-doped $ZrO_2$ which is an oxygen ion conductor. However, many other materials have been proposed, and the invention is applicable to all of these. A variety of different anode materials have been proposed for use at the fuel side of SOFCs. However, for the purposes of the present invention we are concerned only with nickel-containing anodes. Such anodes have included nickel plating layers and nickel alloys, but the presently most preferred material is a $Ni/ZrO_2$ cermet. Likewise, a variety of different cathode materials have been proposed for the air side of SOFCs, but the particular cathode material is not relevant to the present invention. However, the presently preferred cathode material is strontium doped lanthanum manganite ($LaMnO_3$).

The purpose of the interconnect between individual fuel cells, as well as at each end of a fuel cell stack and at each side of a single fuel cell, is to convey electrical current away from the fuel cell and/or between adjacent fuel cells and heat away from the fuel cell or cells. To this extent an interconnect should have a relatively high electrical conductivity, which is preferably only electronic or at least primarily electronics to minimize voltage losses, with negligible contact resistance at the interconnect/electrode interface. It should also have a relatively high thermal conductivity to provide improved uniformity of heat distribution and to lower thermal stresses. A thermal conductivity above 25W/m K is desirable. In addition, since an intermediate interconnect in a fuel cell stack extends between the anode of one fuel cell and the cathode of the adjacent fuel cell, the interconnect must be impervious to gases in order to avoid mixing of the fuel and the oxidant. Thus, it should have a relatively high density and no open porosity, as well as stability in both oxidizing and reducing environments at the operating temperature. The interconnect should also have high creep resistance so that there is negligible creep at the operating temperature, and a low vapour pressure. The interconnect should further have phase stability during thermal cycling, a low thermal expansion mismatch between cell components, as well as chemical stability with respect to components with which it is in contact. The interconnect should also preferably have reasonable strength, since it may provide structural support, as well as low cost, ease of fabrication and low brittleness.

Ceramic, cermet and alloy interconnects have been proposed. Metallic materials have the advantages generally of high electrical and thermal conductivities and of being easier to fabricate. However, stability in a fuel cell environment, that is high temperatures in both reducing and oxidizing atmospheres, limits the number of available metals that can be used in interconnect. Most high temperature oxidation resistant alloys have some kind of built-in protection mechanism, usually forming oxidation resistant surface layers. Metallic materials commonly proposed for high temperature applications include, usually as alloys, Cr, Al, and Si, all of which form protective layers. For the material to be useful as an interconnect in solid oxide fuel cells, any protective layer which may be formed by the material in use must be at least a reasonable electronic conductor. However, oxides of Al and Si are poor conductors. Therefore, alloys which appear most suitable for use as metallic interconnects in SOFCs, whether in cermet or alloy form, contain Cr in varying quantities. Cr containing alloys form a layer of $Cr_2O_3$ at the external surface even at very low oxygen partial pressures example $pO_2 < 10^{-23}$ atm. This is even lower than the oxygen partial pressure on the fuel side of the fuel cell, which is of the order of $10^{-18}$ to $10^{-}$ atm. This oxide layer provides oxidation resistance to the Cr alloy but, while it exhibits reasonable conductivity in air, in reducing atmospheres (hydrogen-water, syngas) as present on the fuel side of the interconnect the electrical conductivity is substantially lower. Furthermore, Cr and Ni form solid solutions, which tends to cause Ni from an Ni-containing anode on the fuel side of the interconnect to diffuse into the Cr alloy of the interconnect and the Cr from the interconnect to diffuse into the anode. With an anode formed of an $Ni/ZrO_2$ cermet, the diffusion of Ni from the anode leaves a highly resistive zirconia interface layer behind. Both phenomena lead to unacceptable contact resistance at the anode/interconnect interface which needs to be avoided.

The problem of nickel from a Ni-containing anode diffusing into the Cr alloy of the interconnect has been alleviate to a degree by applying a nickel coating to the surface of the interconnect. However, Cr tends to diffuse through this surface coating from the interconnect substrate and form a $Cr_2O_3$ surface layer which provides poor electrical contact with the anode.

It has also to alleviate the problem by providing a nickel mesh between the anode mad interconnect which provides a satisfactory conductivity path because of the relatively small contact area. However, the mesh forms another component in the cell structure which complicates manufacturing techniques.

SUMMARY OF THE INVENTION

According to the present invention there is provided an electrical interconnect device for a planar fuel oil comprising solid oxide electrolyte, a cathode and a nickel-containing anode, the interconnect device comprising a plate-like chromium-containing substrate having fuel gas-flow channel on one side and an oxidation-resistant coating on surfaces of said one side adapted to contact the anode, wherein the coating comprises an outer oxygen barrier layer for electrically contacting the anode and comprising Ni, a noble metal except Ag or an alloy of one or more of these metals and an electrically conductive metal barrier layer comprising Nb, Ta, Ag or alloys of one or more of these metals between the substrate and the outer layer.

Further according to the present invention there is provided a planar fuel cell assembly including a fuel cell comprising solid oxide electrolyte, a cathode and a nickel-containing anode, and an interconnect device substantially as described in the immediately preceding paragraph in electrical contact with the anode.

By the present invention, the metal barrier layer, acts to alleviate Cr diffusion to the Ni-containing anode and Ni diffusion to the Cr-based interconnect device substrate, as well as, in some embodiments, oxygen diffusion to the interconnect alloy surface. However, both Nb and Ta readily oxidize to their oxides at the relatively high operating temperatures of a fuel cell even in relatively low oxygen partial pressures and the outer oxygen barrier layer of the interconnect coating is provided to alleviate this. Additionally, Ag allows oxygen to diffuse therethrough which may lead to corrosion underneath an Ag metal barrier layer, and the outer barrier layer is provided to alleviate this. Ag alone as the metal barrier layer may melt at the higher operating temperatures of a fuel cell, but may be suitable for low temperature operation at, for example, below 850° C. Advantageously, Ag may be alloyed with one or more other metals, such as Pd.

Preferably, the oxidation resistant coating is at least substantially fully dense, that is substantially Without open pores which would permit gaseous mass transfer of oxygen.

The noble metal or metals which may be included in the outer barrier layer of the oxidation-resistant coating of the interconnect device include Pt, Pd, Au, Ir, Rh and Ru. The preferred metal of the outer barrier layer if Ni or Pt or alloys incorporating either or both of these.

Any one of the identified metals for either barrier layer may be doped or alloyed, whether with another identified metal(s) or with other metal(s), to improve one or more parameters such as electrical conductivity and stability.

Each of the barrier layers of the oxidation-resistant coating may be in the range of 0.5 to 100 microns in thickness, preferably 1 to 50 microns. The most preferred thickness for the metal barrier layer is 5 to 15 microns, for example 8 to 10 microns while the most preferred thickness for the outer barrier layer is 5 to 20 microns, for example about 15 microns.

The chromium-containing substrate of the interconnect device may be formed of, for example, an alloy or a cermet. Such a cermet may be a combination of Cr and Ni with a ceramic such is $Al_2O_3$ or $ZrO_2$, for example Inconel/alumina. Possible alloy materials are the Siemens-Plansee alloy, Haynes 230 alloy and high temperature alloys such as Nicrofer, Inconel and other chromium containing steels. The preferred interconnect device substrate materials are alloys which have a thermal expansion coefficient closely matching those of the other fuel cell components (ranging from 10.5 to $12.0 \times 10^{-6}$K). These include the Siemens-Plansee alloy (94 wt % Cr, 5 wt % Fe and 1 wt % $Y_2O_3$) and ferritic steels.

The individual barrier layers may be applied to the surface of the Cr-containing interconnect substrate by any one of several techniques, including sputtering of the metal(s) from a target, electroplating of the metal(s), electroless plating of the metal(s), ion beam evaporation, physical vapour deposition from a metal target, plasma spray and laser techniques. While magnetron sputtering has been used in the Examples below to apply the barrier layers, it is likely that cheaper method will be adopted in commercial practice, such as electroplating on vacuum plasma spraying.

Cleaning the interconnect surface, for example by etching, polishing/grinding etc., prior to application of the metal barrier layer, may improve the quality of the oxidation-resistant coating.

BRIEF DESCRIPTION OF THE DRAWINGS

The present invention will be further described by way of example only with reference to the accompanying drawings in which.

DETAILED DESCRIPTION OF THE DRAWINGS

Figure 1:
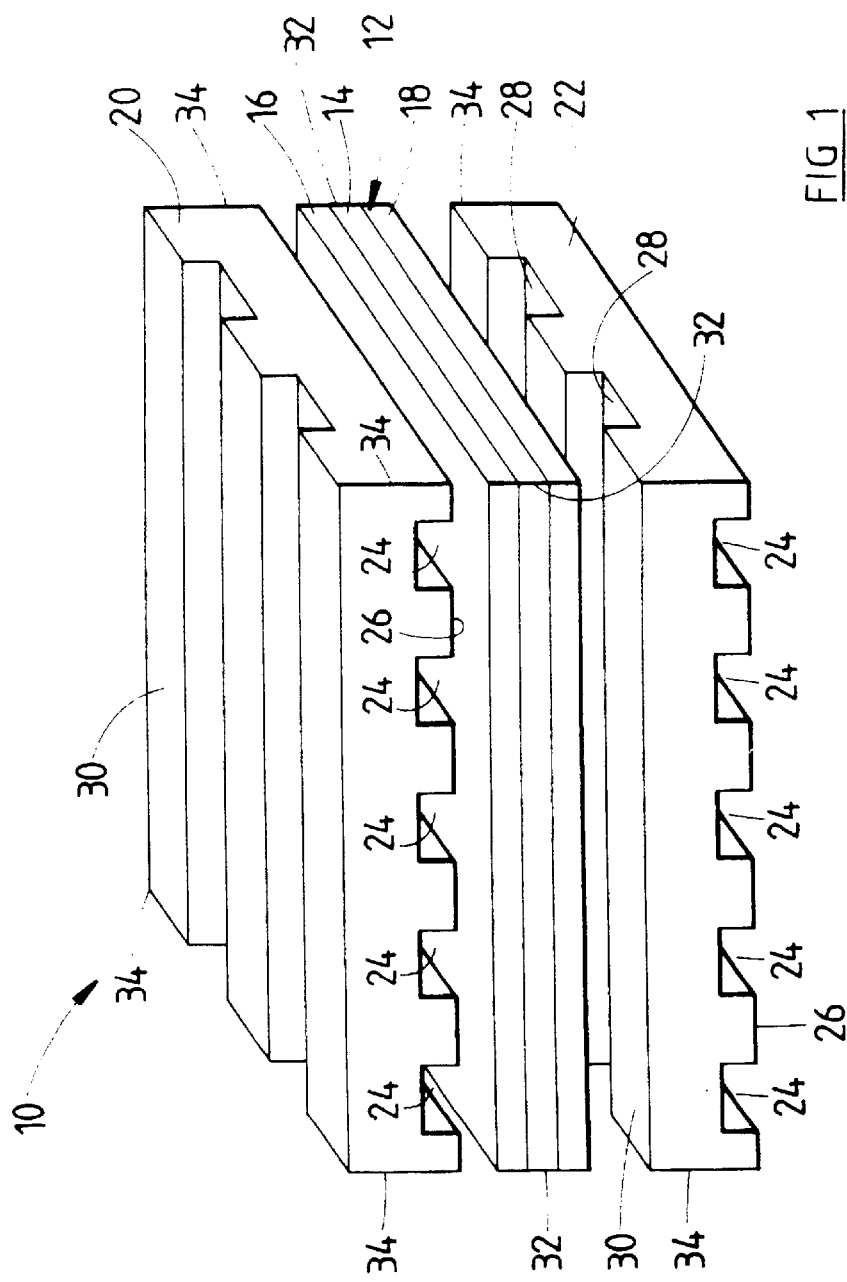
FIG. 1 is an exploded perspective view of a fuel cell assembly.

The fuel cell assembly 10 shown in exploded form in FIG. 1 has a typical structure which may be used in the present invention. As illustrated, the structure is known and will therefore not be described in detail. The assembly comprises a planar fuel cell 12 comprising a solid oxide electrolyte central layer 14 with an integral anode layer 16 overlying one face of the electrolyte and an integral cathode layer 18 overlying the opposite face of the electrolyte. The electrode layers may be applied by known screenprinting techniques. The fuel cell is sandwiched between a pair of interconnects 20 and 22 which in use are in face to face contact with the anode 16 and cathode 18 respectively.

The interconnects 20 and 22 shown in FIG. 1 are identical with an array of gaseous fuel channels 24 extending across the underside 26 and an array of gaseous oxidant flow channels 28 extending across the top side 30. The channels 24 and 28 are shown extending at right angles to each other but they may extend parallel and the respective gas flow directions may then be the same or opposite depending upon the manifolding arrangements. By providing the gas flow channels on both sides, the interconnects 20 and 22 may be used to form a fuel cell stack in which an identical fuel cell 12 overlies the interconnect 20 and another identical fuel cell 12 underlies the interconnect 22. Further identical interconnects may then be placed adjacent the opposite sides of the further fuel cells, and so forth to build up a fuel cell stack of the desired number of fuel cells. The interconnects provided at the ends of the stack need only have one of the arrays of gas channels, gas channels 24 for the interconnect at the top of the stack as described and gas channels 28 for the interconnect at the bottom of the stack as described. Likewise in a fuel cell assembly comprising only a single fuel cell 12 the proposed interconnects need only have the respective array of gas channels on the face in contact with the fuel cell. These end interconnects are commonly termed end plates.

In use, the gaseous fuel and oxidant flows must be kept apart and suitable manifolding (not shown) is provided to ensure this. In the cross flow arrangement illustrated this is conveniently provided by an inert cylindrical sleeve, for example of ceramic, which extends around the fuel cell stack with its axis normal to the gas flow channels 24 and 28 and with the corners 32 of the fuel cells 12 and the corners 34 of the interconnects sealed in contact with the annular inner surface of the sleeve. The fuel cell assembly is completed by terminals on the top and bottom end plate interconnects for attachment of the fuel cell or fuel cell stack to an external load.

As noted a ready, the fuel cell assembly 10 is known and in the described embodiment the fuel cell 12 comprises a solid oxide electrolyte 14 of $Y_2O_3$-doped $ZrO_2$ as an ionic conductor while the electrodes 16 and 18 are at least primarily electronic conductors with the anode 16 comprising an $Ni/ZrO_2$ cermet and the cathode 18 comprising strontium-doped lanthanum manganite.

In the described embodiment the impervious interconnects 20 and 22 are formed of the Siemens-Plansee alloy comprising 94 wt % Cr, 5 wt % Fe and 1 wt % $Y_2O_3$. The purpose of the interconnect is to convey electrical current between adjacent fuel cells, and to convey heat away from fuel cells. However, at the operating temperature of 800° C. to 1000° C. of the described embodiment, an electrically resistive layer forms at the anode/interconnect interface even at the low oxygen partial pressure present in the fuel environment, as described hereinbefore this is illustrated in FIGS. 3 and 4 which are graphs showing the overall increase in contact resistivity with time in a test cell of the type shown in FIG. 2.

Figure 2:
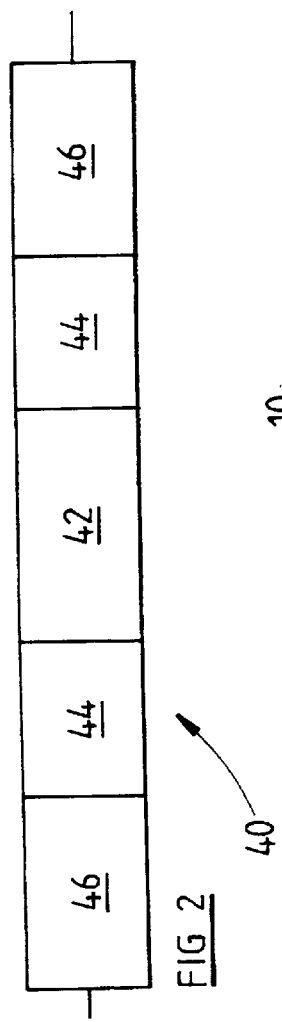
FIG. 2 is a schematic illustration of a cell arrangement used for measuring anode/interconnect interface contact resistance.

The cell 40 shown in FIG. 2 was developed merely to test the resistivity at an interface between the material of the interconnect and the material of the anode of the fuel cell assembly 10 in reducing conditions. The cell comprises a sandwich structure having a core disc 42 formed the interconnect material, the Siemens-Plansee alloy, with a thickness of 2.5 mm. Intermediate opposed layers 44 of the anode material, porous $Ni/ZrO_2$ cermet, each of a thickness 50 to 100 microns, are screenprinted onto respective outer discs 46 of dense anode material $Ni/ZrO_2$ cermet, which act as contact surfaces. The porous and dense cermet anode material comprise tetragonal zirconia, that is zirconia doped with 3% $Y_2O_3$. The discs 42 and 46 are pressed together so that close contact between the interconnect core disc 42 and the porous anode layers 44 is ensured.

Figure 3:
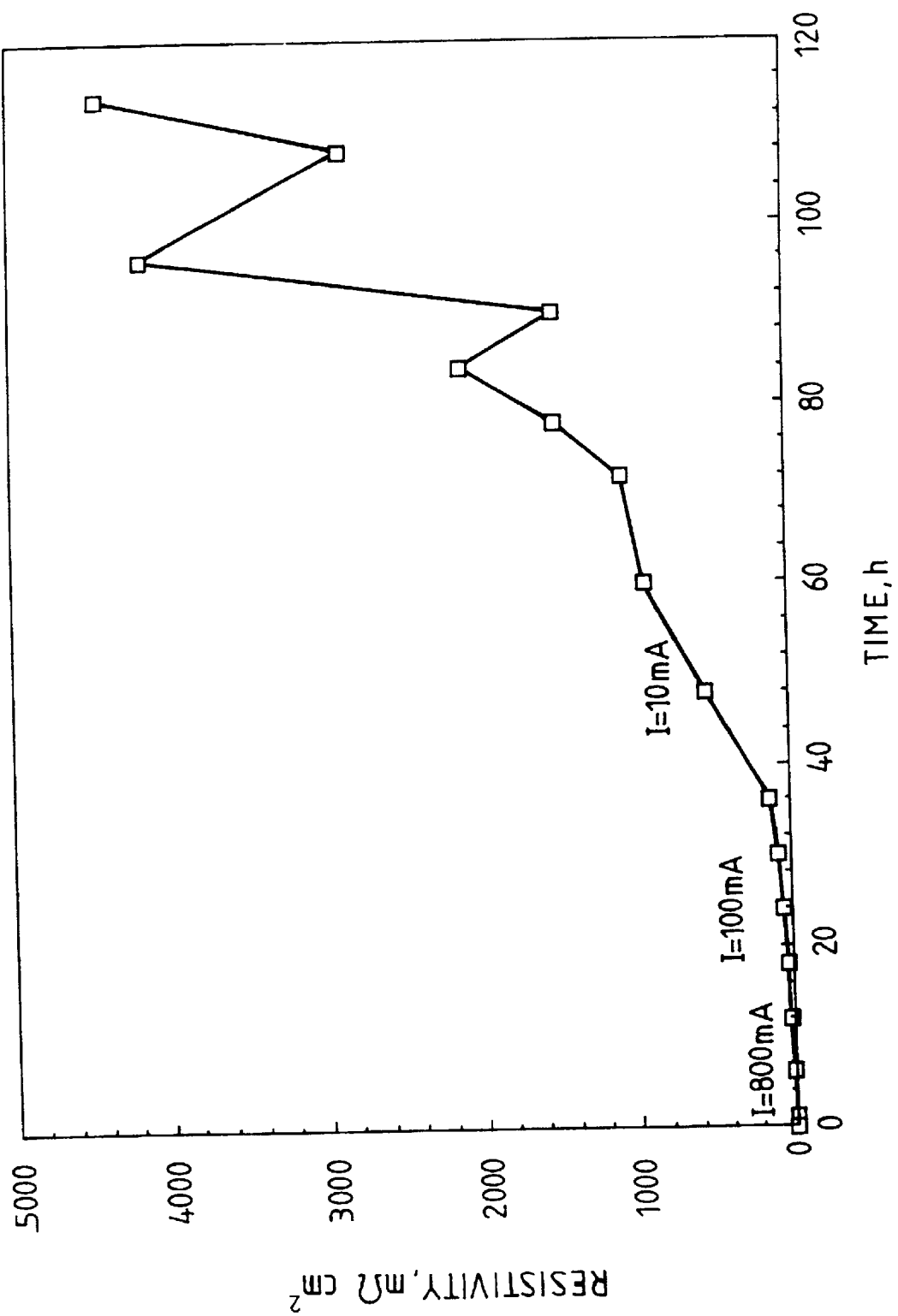
FIG. 3 is a graph showing contact resistance over time measured by a first cell of the type shown in FIG. 2 having direct contact between Cr containing interconnect and Ni containing anode materials.
Figure 4:
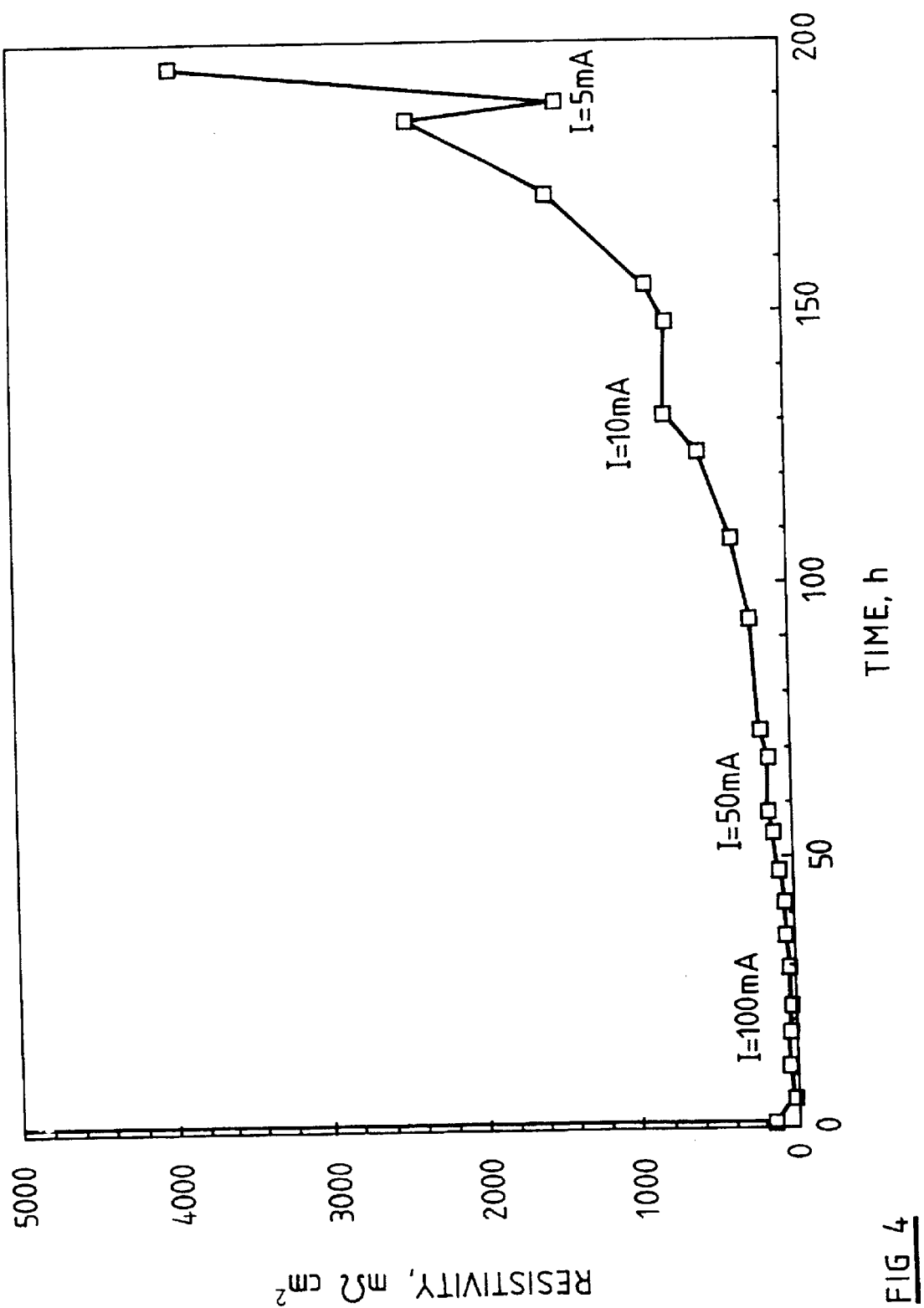
FIG. 4 is a graph showing contact resistance over a period of time measured by a second cell of the type shown in FIG. 2 having direct contact between Cr containing interconnect and Ni containing anode material.

Two different cells having the structure described above were tested with a current I being passed through as shown in FIGS. 3 and 4.

The first cell was heated in a reducing atmosphere of 10% $H_2/N_2$ to 1000° C. from room temperature and FIG. 3 shows the contact resistance measurements over a period of 115 hours under these conditions. The current used initially in this example was 800 mA, but after about 20 hours this was reduced to 100 mA and after about another 20 hours this was reduced again to 10 mA as resistivity increased and the higher current levels could not be supported.

The contact resisitivity for the first cell was initially only 3.4 m$\Omega$cm$^2$ soon after the temperature reacted 1000° C. However, after about 20h it started to increase rapidly, and over a period of 115 hours the contact resistivity at the interfaces between the interconnect disc 42 and the anode layers 44 increased to 4 $\Omega$cm$^2$. Examination of the interconnect plates showed a dark green oxide layer all over the interconnect material. The resistivity of this layer at room temperature was extremely high.

The second cell was heated to 1000° C. in $N_2$, following which 10% $H_2$ was introduced to the atmosphere. The contact resistance measurements for this cell are shown in FIG. 4. The resistivity initially decreased from 14 $\Omega$cm$^2$ to 43 m$\Omega$cm$^2$ after 6 h at 1000° C. in 10% $H_2/N_2$. However, over a period of 200 h the contact resistivity of the interconnect/electrode interface increased to 3.9 $\Omega$cm$^2$. On removal of the cell from the rig, a dark green oxide layer was observed but no cracking was visible. The oxide layer again had extremely high resistance.

The initial current to the second cell was 100 mA, but, as with the first cell, this was gradually decreased as resistivity increased, to a final level of 5 mA after about 180 hours.

X-ray diffraction (XRD) work performed on Cr-containing interconnect specimens heated in air, hydrogen and 10% hydrogen/nitrogen clearly showed the presence of chromium oxide ($Cr_2O_3$). No other phase was detected. From these results it is clear that the interconnects oxidize heavily even in 10% hydrogen in nitrogen, and the resulting oxide layer seems to be more resistive than the oxide layer formed in air. Possible diffusion of Ni metal into Cr and the depletion of the Ni metal from the Ni/zirconia cermet electrode may also contribute to high resistivity a the interface.

EXAMPLES

The following examples test the invention by applying oxidation resistant coatings to the interconnect materials in the cell 40.

Example 1

Figure 5:
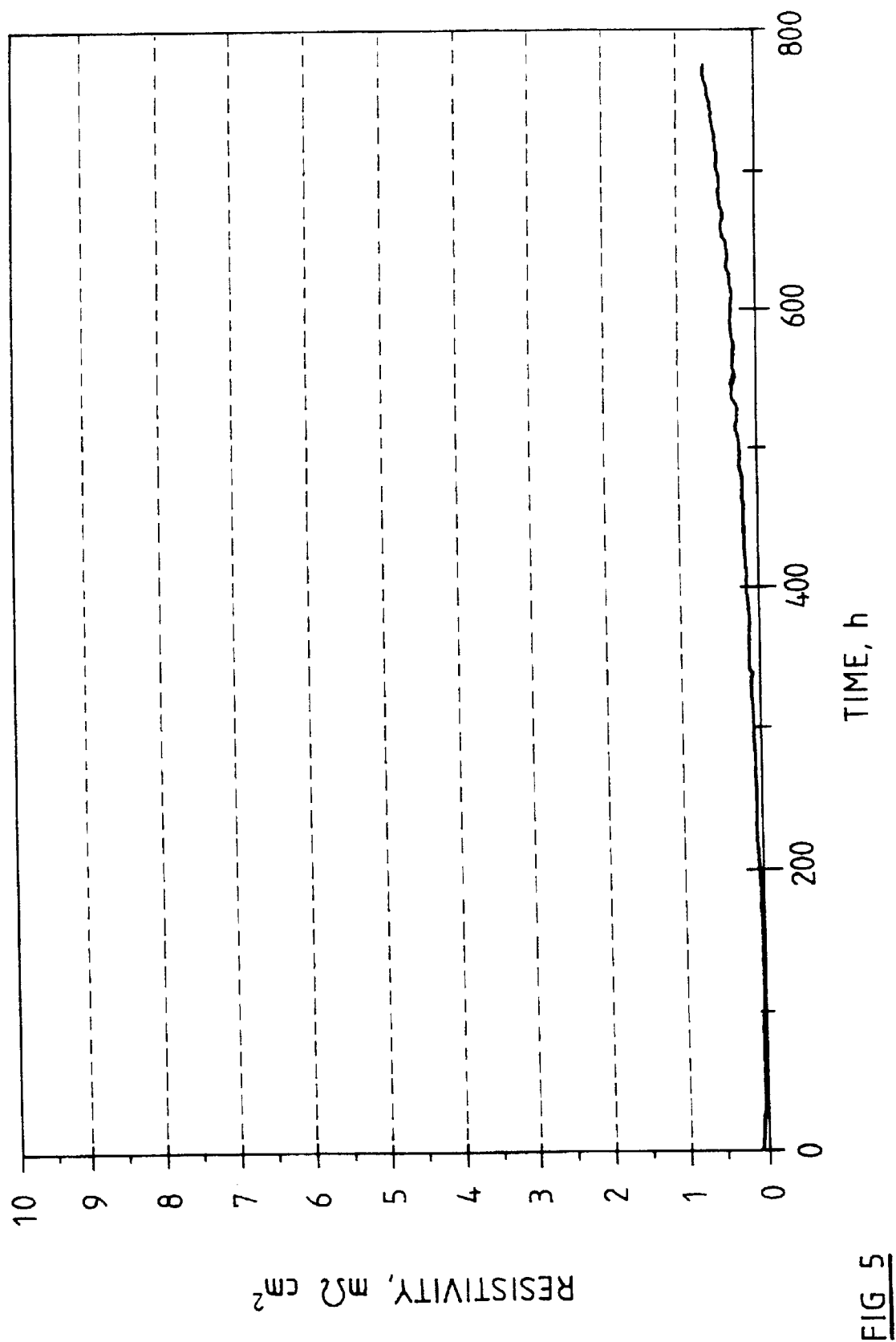
FIG. 5 is a graph showing contact resistance over time measured by a third cell of the type shown in FIG. 2 but with the faces of the interconnect material contacting the anode material coated with a barrier layer of Nb and an outer layer of Ni.

In this example, firstly a metal barrier layer of Nb was applied to the opposed faces of the interconnect disc 42 by magnetron sputtering to a thickness of about 10 microns. Then an outer barrier layer of Ni was applied to each Nb layer by magnetron sputtering to a thickness of about 15 microns to form the oxidation resistant coating. The cell was then made up with the Ni outer layer pressed into close contact with respective porous nickel/zirconia cermet layers 44 on the discs 46. Contact resistance measurements were again carried out at 1000° C. in an atmosphere of 10% $H_2N_2$, and the results are shown in FIG. 5. The cell was tested in the same manner as the uncoated first interconnect cell 40, except that in this example the current was maintained at 250 mA throughout. The contact resistance remained low and even after testing for 750 h was below 0.7 $m\Omega cm^2$. This indicates that no oxidation of Cr occurred and that there was no diffusion of Cr from the interconnect or of Ni from the porous anode.

Example 2

Figure 6:
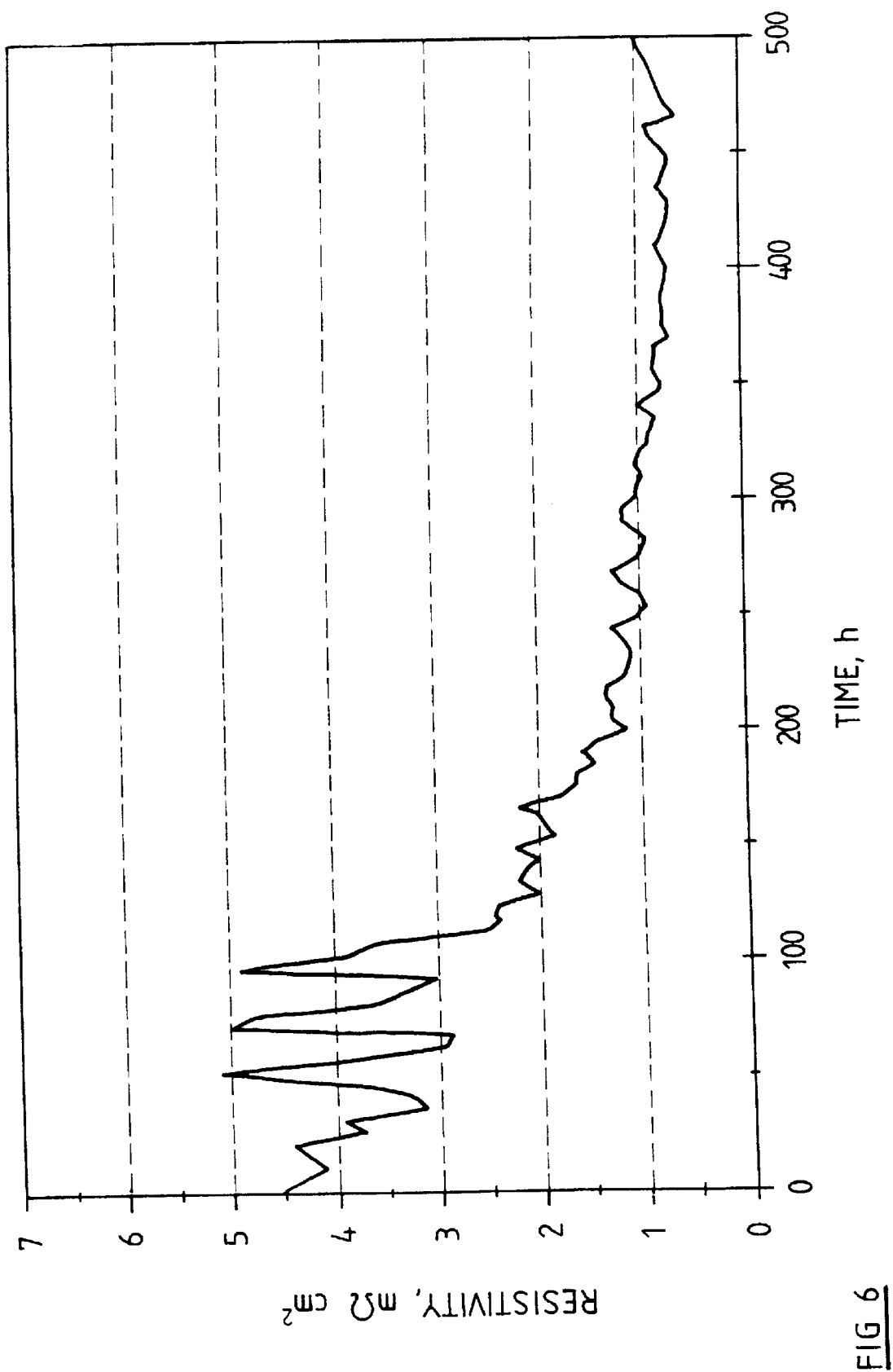
FIG. 6 is a graph showing contact resistance over time measured by a fourth cell of the type shown in FIG. 2 but with the faces of the interconnect material contacting the anode material coated with a barrier layer of Ta and an outer layer of Pt.

In this example firstly, a metal barrier layer of Ta was applied to the opposed faces of the interconnect disc 42 by magnetron sputtering to a thickness of about 10 microns. Then an outer barrier layer of Pt was applied to each Ta layer by magnetron sputtering to a thickness of about 15 microns to form the oxidation resistant coating. The cell was then made up with the Pt outer layers pressed into close contact with respective porous nickel/zirconia cermet layers 44 on the discs 46. Contact resistance measurements were again carried out at 1000° C. in an atmosphere of 10% $H_2N_2$ over a period of 500 hours, and the results are shown in FIG. 6. The 11 was tested in the same manner as the uncoated first interconnect cell 40, except that in is example the current was maintained at 250 mA throughout. Very low contact resistance (around 1 $m\Omega cm^2$) was measured after an initial settling-in period, and Cr was not detected in the Pt outer layer. This indicates that no oxidation of Cr occurred and that there was no diffusion of Cr from the interconnect or of Ni from the porous anode. Those skilled in the art will appreciate that the invention described herein is susceptible to variations and modifications other than those specifically described. It is to be understood that the invention includes all such variations and modifications which fall within the its spirit and scope. The invention also includes all of the steps, features, compositions and compounds referred to or indicated in this specification, individually or collectively, and any and all combinations of any two or more of said steps or features. In particular, it will be appreciated that other barrier layer metals than those identified herein may be appropriate for use alone or in alley form and that the oxidation resistant layer may be formed of other metal or metals than the se identified herein.

What is claimed is:

1. An electrical interconnect device for a planar fuel cell comprising solid oxide electrolyte, a cathode and a nickel-containing anode, the interconnect device comprising a chromium-containing substrate having fuel gas-flow channels on one side and an oxidation-resistant coating on surfaces of said one side adapted to contact the anode, wherein the coating comprises an outer oxygen barrier layer for electrically contacting the anode comprising Ni, a noble metal except Ag or an alloy of at least one of these metals and an electrically conductive metal barrier layer comprising Nb, Ta, Ag or alloys of at least one of these metals between the substrate and the outer layer.

2. The electrical interconnect device according to claim 1, wherein the outer oxygen barrier layer comprises a metal or an alloy comprising at least one of the metals Ni, Pt, Pd, Au, Ir, Rh and Ru.

3. The electrical interconnect device according to claim 1, wherein the outer oxygen barrier layer comprises Ni or Pt or an alloy incorporating at least one of Ni and Pt.

4. The electrical interconnect device according to claim 1, wherein the outer oxygen barrier layer has a thickness in the range of about 0.5 microns to about 100 microns.

5. The electrical interconnect device according to claim 1, wherein the metal barrier layer has a thickness in the range of about 0.5 micron to about 100 microns.

6. The electrical interconnect device according to claim 1, wherein the metal barrier layer includes Nb and the outer oxygen barrier layer includes Ni.

7. The electrical interconnect device according to claim 6, wherein the metal barrier layer has a thickness of about 10 microns and the outer oxygen barrier layer has a thickness of about 15 microns.

8. The electrical interconnect device according to claim 1, wherein the metal barrier layer includes Ta and the outer oxygen barrier layer includes Pt.

9. The electrical interconnect device according to claim 8, wherein the metal barrier layer has a thickness of about 10 microns and the outer oxygen barrier layer has a thickness of about 15 microns.

10. The electrical interconnect device according to claim 1, wherein the chromium containing substrate is formed of a material comprising 94 wt % Cr. 5 wt % Fe, and 1 wt % $Y_2O_3$.

11. A planar fuel cell assembly including a fuel cell comprising a solid oxide electrolyte, a cathode and a nickel-containing anode, and an interconnect device according to claim 1 in electrical contact with the anode.

12. The planar fuel cell assembly according to claim 11, wherein the nickel-containing anode comprises an $Ni/ZrO_2$ cermet.

13. The electrical interconnect device according to claim 1 wherein the outer oxygen barrier layer has a thickness in the range of about 1 micron to about 50 microns.

14. The electrical interconnect device according to claim 1 wherein the outer oxygen barrier layer has a thickness in the range of about 5 microns to about 20 microns.

15. The electrical interconnect device according to claim 1 wherein the metal barrier layer has a thickness in the range of about 1 micron to about 50 microns.

16. The electrical interconnect device according to claim 1 wherein the metal barrier layer has a thickness in the range of about 5 microns to about 15 microns.

* * * * *